United States Patent
Schog et al.

(10) Patent No.: US 7,201,258 B2
(45) Date of Patent: Apr. 10, 2007

(54) DISC BRAKE

(75) Inventors: Michael Schog, Mertloch (DE); Karl-Heinz Wollenweber, Ochtendung (DE); Christian Schroeter, Sinzig (DE); Dirk Hees, Mayen (DE); Guido Zenzen, Macken (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/230,364

(22) Filed: Sep. 20, 2005

(65) Prior Publication Data

US 2006/0060431 A1    Mar. 23, 2006

Related U.S. Application Data

(63) Continuation of application No. PCT/EP04/02607, filed on Mar. 12, 2004.

(30) Foreign Application Priority Data

Mar. 20, 2003    (DE)    ................ 103 12 478

(51) Int. Cl.
*F16D 65/14* (2006.01)
(52) U.S. Cl. ................ 188/73.45; 188/73.31; 188/73.46; 188/73.47
(58) Field of Classification Search ........ 188/70 R, 188/71.1, 71.3, 72.4, 73.1, 73.31, 73.39, 188/73.41, 73.42, 73.43, 73.44, 73.45, 73.46, 188/73.47, 250 D, 250 F
See application file for complete search history.

(56) References Cited

U.S. PATENT DOCUMENTS

| | | | | |
|---|---|---|---|---|
| 3,298,468 A | | 1/1967 | Buyze | |
| 3,915,263 A | * | 10/1975 | Courbot | 188/72.4 |
| 4,197,926 A | * | 4/1980 | Youngdale | 188/18 A |
| 4,219,106 A | | 8/1980 | Lüpertz et al. | |
| 4,355,707 A | | 10/1982 | Saito | |
| 4,382,493 A | * | 5/1983 | La Warre, Sr. | 188/73.43 |
| 4,736,822 A | * | 4/1988 | Thiel et al. | 188/73.32 |
| 5,860,496 A | * | 1/1999 | Kullman et al. | 188/73.45 |
| 6,062,349 A | | 5/2000 | Boisseau et al. | |
| 6,179,095 B1 | * | 1/2001 | Weiler et al. | 188/73.38 |
| 6,260,670 B1 | * | 7/2001 | Maehara | 188/73.47 |
| 2004/0154885 A1 | * | 8/2004 | Gotti et al. | 188/250 B |

FOREIGN PATENT DOCUMENTS

| | | |
|---|---|---|
| DE | 1 238 284 | 4/1967 |
| DE | 1 505 491 | 9/1969 |
| DE | 1 575 920 | 1/1970 |
| DE | 28 45 404 | 5/1979 |
| DE | 28 04 808 | 8/1979 |
| DE | 41 15 064 | 12/1992 |
| DE | 43 24 988 | 2/1995 |
| DE | 44 16 815 | 11/1995 |
| DE | 101 13 347 | 12/2001 |
| DE | 10113347 | * 12/2001 |
| EP | 0480366 | * 10/1991 |
| JP | 03-51525 | 3/1991 |

* cited by examiner

*Primary Examiner*—Devon Kramer
(74) *Attorney, Agent, or Firm*—MacMillan, Sobanski & Todd, LLC

(57) ABSTRACT

A disc brake having a brake carrier (10) which may be fastened to the vehicle and to which bolts are fastened, comprises brake pads (32a, 32b), in the supporting plates of which U-shaped recesses (40, 40') are formed, which are placed onto the bolts, such that the brake pads are axially movably guided relative to the brake disc.

15 Claims, 5 Drawing Sheets

DISC BRAKE

CROSS REFERENCE TO RELATED APPLICATIONS

This application is a continuation of International Application No. PCT/EP2004/002607 filed Mar. 12, 2004, the disclosures of which are incorporated herein by reference in entirety, and which claimed priority to German Patent Application No. 103 12 478.0 filed Mar. 20, 2003, the disclosures of which are incorporated herein by reference in entirety.

BACKGROUND OF THE INVENTION

The invention relates to a disc brake having a brake carrier including bolts and which may be fastened to the vehicle, brake pads and a caliper or frame.

Brakes of this type are universally known. Conventionally, the brake pads, consisting of a support plate and a friction pad, are axially guided relative to the brake disc by means of bolts fastened to the brake carrier. With disc brakes, the term "axially" generally signifies: in a direction parallel to the rotational axis of the brake disc. The term "radially" correspondingly signifies a direction perpendicular to an axial direction in the above sense.

The following patent documents, for example, represent the prior art of such disc brakes: DE 1 238 284, DE 1 505 491, and corresponding U.S. Pat. No. 3,298,468, both of which are incorporated by reference herein in entirety, DE 1 575 920, DE 2 804 808, and corresponding U.S. Pat. No. 4,219,106, both of which are incorporated by reference herein in entirety, DE 2 845 404, DE 41 15 064 and DE 4 416 815. Further patent documents which also belong to the prior art are: DE 101 13 347, U.S. Pat. No. 3,915,263 and U.S. Pat. No. 4,355,707.

A continuing technical problem in the design of disc brakes is the reduction of the manufacturing cost and the weight of the brake combined with high functional reliability and low maintenance costs. The two last-mentioned objects also include, in particular, avoiding susceptibility to damage of the brake caused by corrosion. A particular problem with all brake designs is the avoidance of brake squeal caused by vibrations.

The present invention is devoted to these technical features.

BRIEF SUMMARY OF THE INVENTION

The disc brake according to the invention comprises a brake carrier in a manner known per se and which may be fastened to the vehicle frame and is provided with bolts. The afore-mentioned technical features are achieved according to the invention by at least one of the brake pads comprising U-shaped recesses, in which the guide bolts of the brake carrier engage, such that for braking the brake pads are axially movable relative to the brake disc.

By means of this brake design, not only the afore-mentioned objects are achieved but also easy assembly of the brake is made possible which is particularly advantageous during maintenance work.

A preferred embodiment of the disc brake provides that the brake pad arranged on the face of the brake toward the vehicle outer side (i.e. the side which is located on the externally visible side of the brake disc), is axially movably guided relative to the brake disc with U-shaped recesses engaging the associated bolts.

According to a further preferred embodiment of the invention, the two brake pads are provided with U-shaped recesses on both sides (leading side and trailing side of the brake) and bolts of the brake carrier engage in these recesses for axially guiding the brake pads.

With the above disclosed variants of the invention, it is preferably provided that the brake pads only make line contact in the U-shaped recesses with the respectively associated bolts of the brake carrier. The supporting surfaces of the brake pads on the retaining bolts are therefore preferably designed to be as small as possible, which is to be expressed by the term "line contact".

A further variant of the invention provides that the bolts which support the brake pads are made from a different material from the brake carrier. A low rusting material comes into particular consideration as material for the bolts, such as for example materials with the reference 42CrMoS4V (Material No. 1.7227) or 17CrNiMo 6 (Material No. 1.6587; the material reference numbers provided refer to DIN, German Industry Standard). The bolts for supporting the brake pads may also be manufactured from high-grade screw steel which is corrosion-protected.

The bolts for supporting the brake pads may also be coated with a corrosion prevention agent. A coating may also be provided to ensure the long-term slidability of the brake pads, even under harsh chemical conditions (road salt or the like). A preferred variant of the invention provides that the plane spanned by the axes of the bolts which support the brake pads, has a smaller radial spacing from the rotational axis of the brake disc than the centre of area of the friction pad. The term "centre of area" is understood by the person skilled in the art to be the position of the friction pad of the brake pad at which the friction pad may be supported balanced in horizontal alignment.

Moreover, the afore-mentioned dimensions of the brake components are selected such that when introducing a braking force enabling the vehicle to brake up to a predetermined deceleration of, for example, 0.1 g, only tension forces act on the brake pads. When the brake disc in FIG. 8 rotates anticlockwise about the axis A, then the leading side of the brake is to the right, i.e. corresponding to the recess 40, whilst the trailing side of the brake is located to the left, corresponding to the recess 40'. With braking forces which, with good friction engagement between the tyres and the road surface, do not exceed the afore-mentioned maximum vehicle deceleration in the region of 0.1 g, only tension forces are therefore present on the brake pad 32a, i.e. on the leading side (FIG. 8 to the right) the braking forces are absorbed by the lobe 42 on the leading side of the brake pad (the frictional forces act toward the left in FIG. 8). It is only when a braking force exceeding a deceleration of approximately 0.1 g is introduced that the leading face 46 of the brake pad strikes the associated bolt in the recess 40' and the braking forces are absorbed by the tension forces (lobe 42) and compression forces at the face 46.

The afore-mentioned features, preferably provided for a brake pad on the vehicle outer side, may according to a further embodiment of the invention also be provided for the brake pad on the vehicle inner side.

According to a preferred embodiment of the invention, the plane which runs through the central axis of the bolts that support the brake pad, has a smaller radial spacing from the disc axis than the centre of area of the friction pads. The difference of the said radial spacings is preferably greater than 5%, more preferably greater than 10% and even more preferably greater than 15% of the larger of the two afore-mentioned spacings.

The invention also teaches a particularly low-cost and thus cost-effective method for manufacturing the brake carrier of a disc brake of the afore-mentioned type, the method with regard to machining only being carried out by drilling, spot-facing and thread cutting. Further machining production steps, such as for example milling, are not required. "Spot-facing" is understood by the person skilled in the art to be the smoothing of surfaces produced, for example, by casting. This refers in particular here to smoothing (levelling) of surfaces in the region of bores so that screw heads or the like lie flush with the spot-faced surfaces.

Other advantages of this invention will become apparent to those skilled in the art from the following detailed description of the preferred embodiments, when read in light of the accompanying drawings.

DETAILED DESCRIPTION OF THE INVENTION

Figure 1:
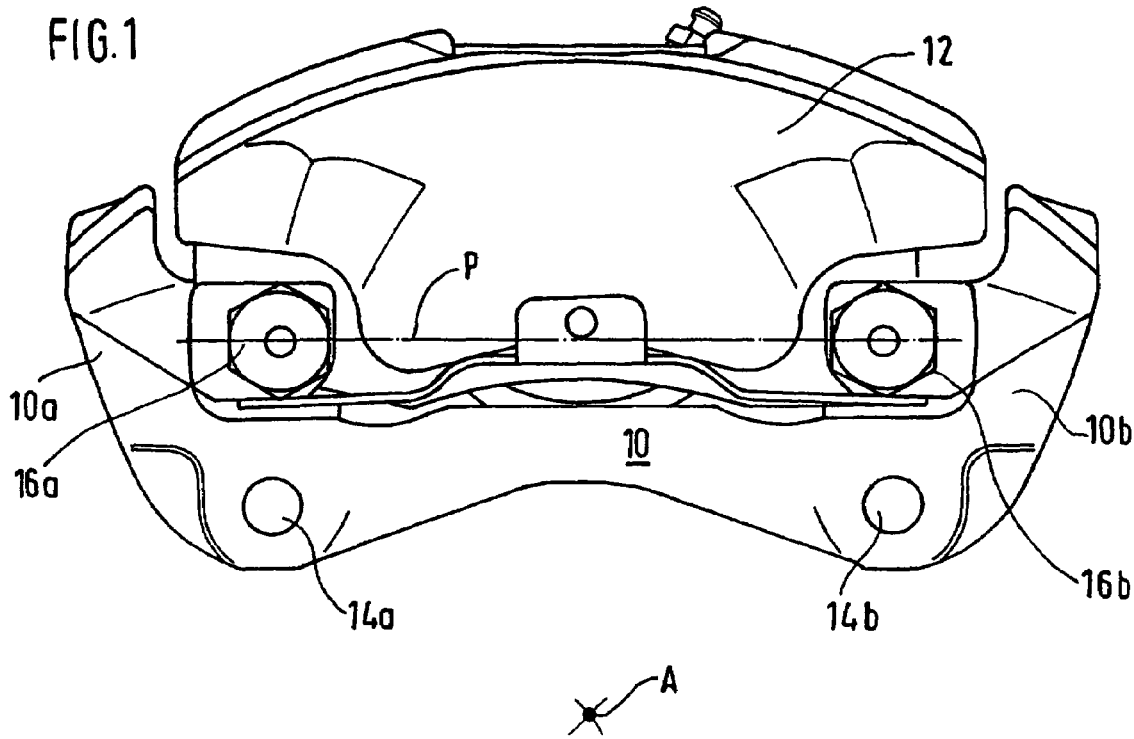
FIG. 1 is a disc brake in front view, i.e. in the assembled state seen from the outer side of the vehicle.

As is shown in particular in FIGS. 1, 2, 5, 6, a brake carrier 10 comprises two arms 10a, 10b. Over the brake carrier is arranged a brake caliper 12, which in the embodiments shown is configured as a floating caliper in two parts. The brake caliper comprises a portion 12a toward the vehicle inner side and a portion 12b toward the vehicle outer side. The portions 12a, 12b are rigidly connected to one another by screws 26a, 26b, 26c, 26d (cf. FIGS. 2 and 7). The brake carrier 10 is fastened rigidly to the vehicle, in the conventional manner, for which serve holes 14a, 14b and screws (not shown).

Figure 5:
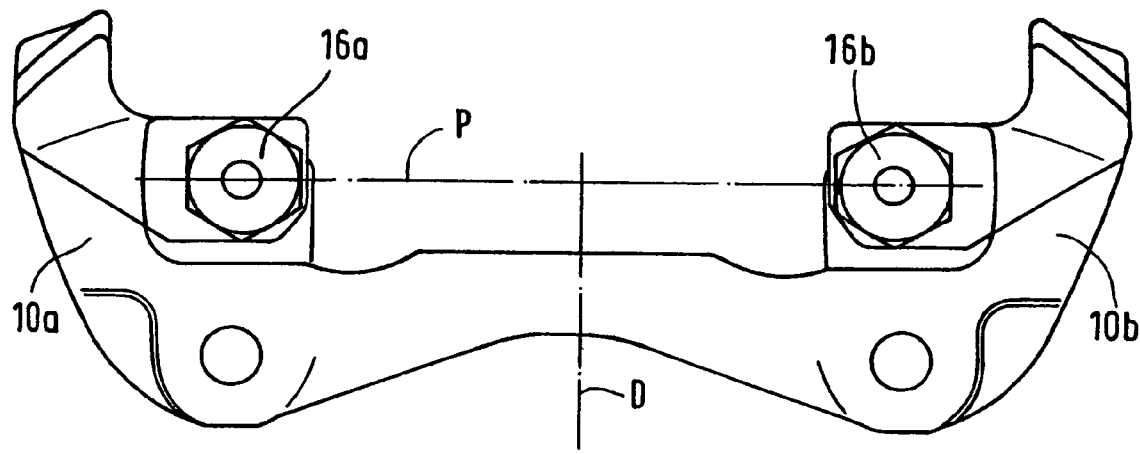
FIG. 5 is the brake carrier in front view.
Figure 6:
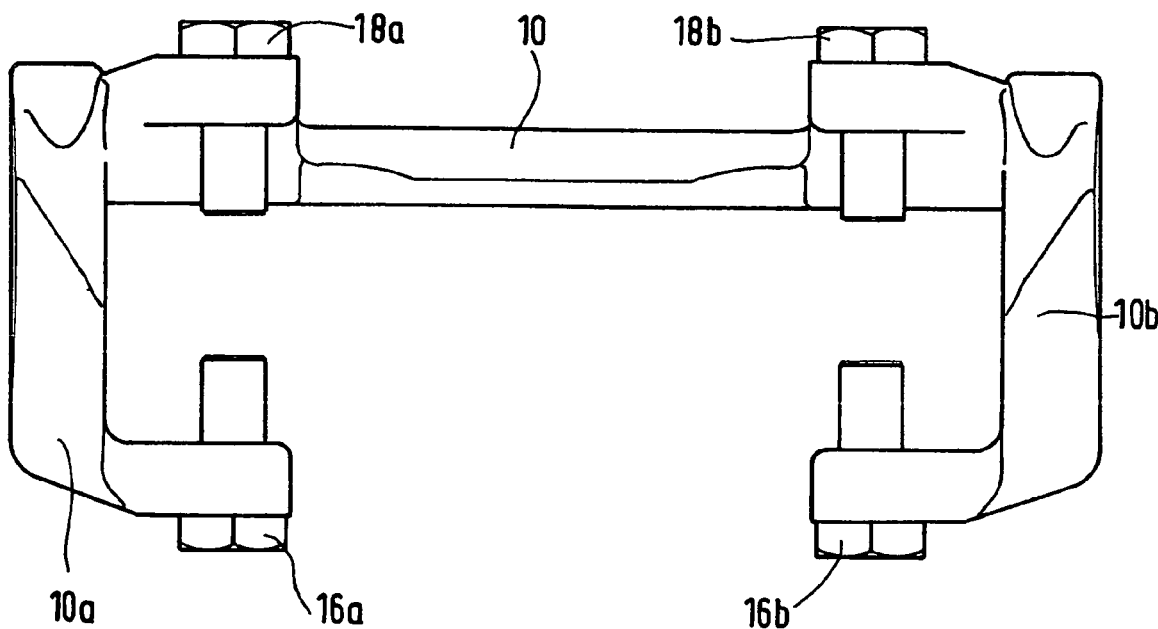
FIG. 6 is the brake carrier in plan view.

As FIG. 6 (and FIGS. 1, 3, 4, 5) particularly show, stud bolts 16a, 16b, 18a, 18b are rigidly connected to the brake carrier 10. The afore-mentioned stud bolts are provided with external threads over a portion of their longitudinal extent which is screwed into a matching internal thread in the brake carrier 10. The exposed portions of the stud bolts in FIG. 6 are thread-free. These bare portions of the stud bolts 16a, 16b, 18a, 18b serve to support the brake pads, as is described below in more detail.

Figure 3:
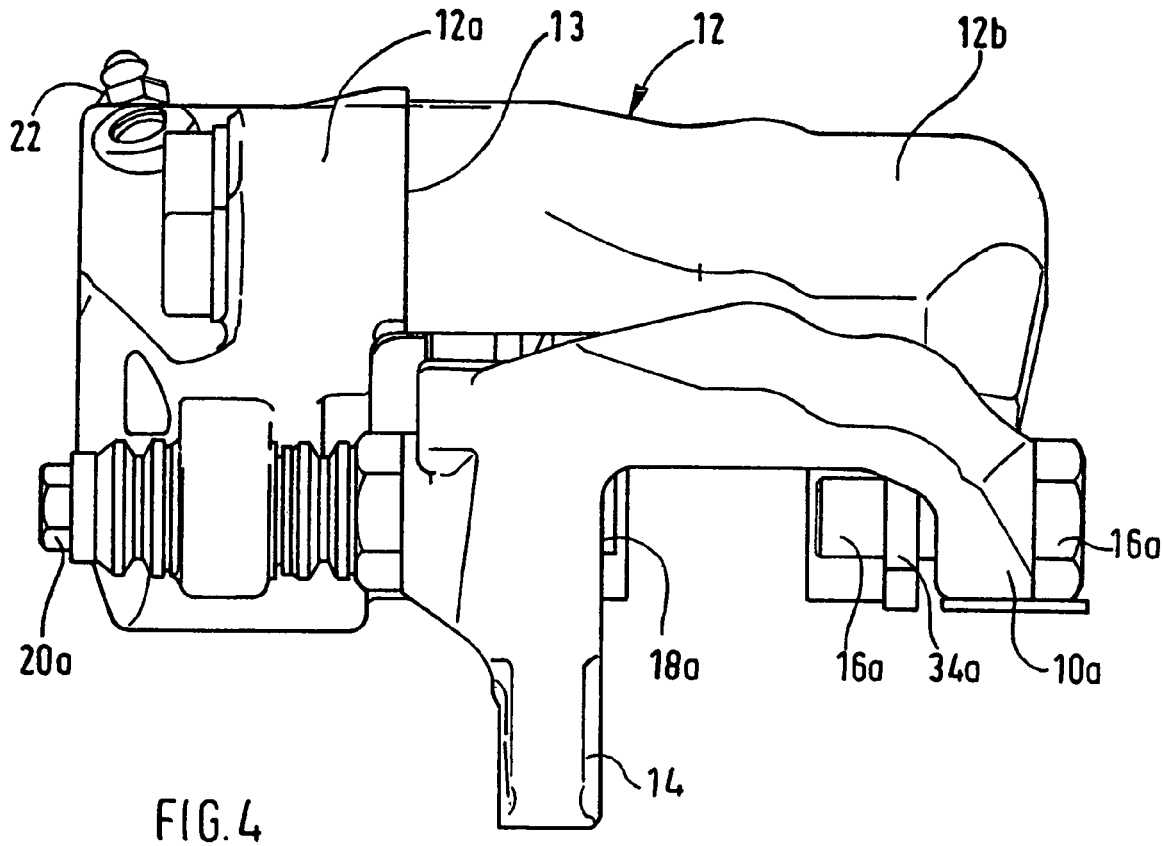
FIG. 3 is the disc brake according to FIGS. 1 and 2 from the side, i.e. in the direction of the plane of the brake disc.
Figure 4:
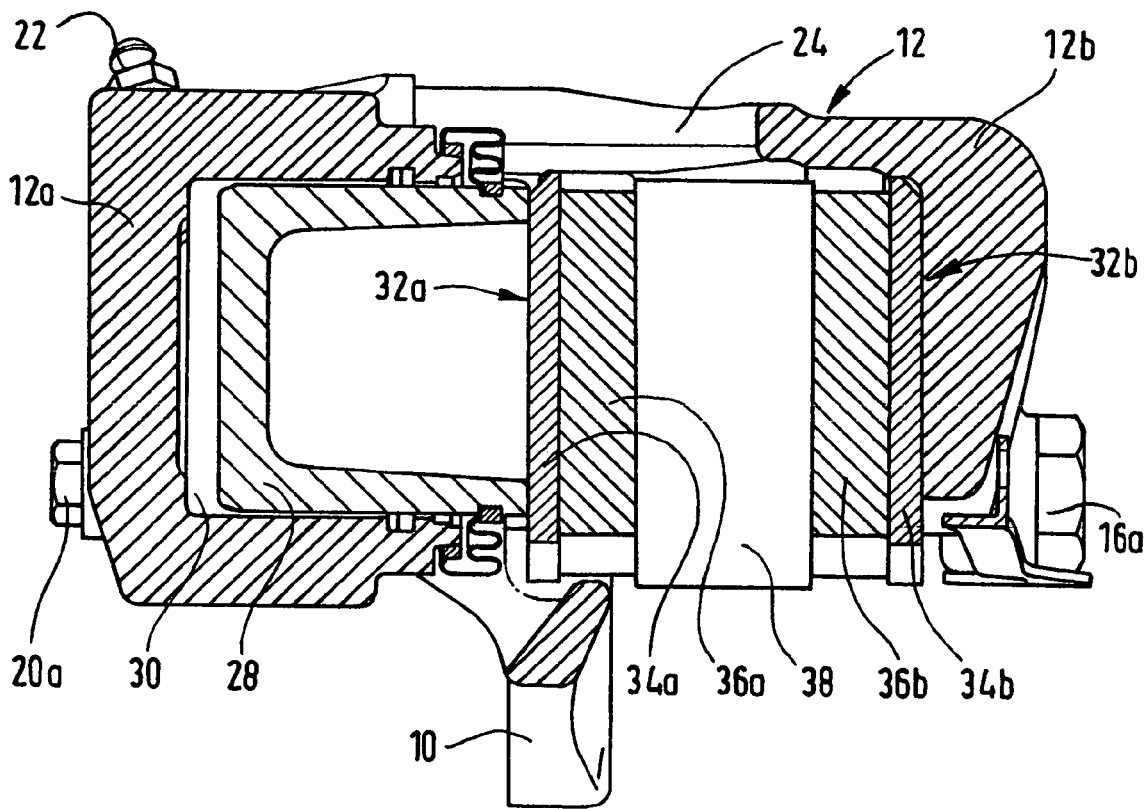
FIG. 4 is the disc brake according to FIGS. 1 to 3 in section.
Figure 7:
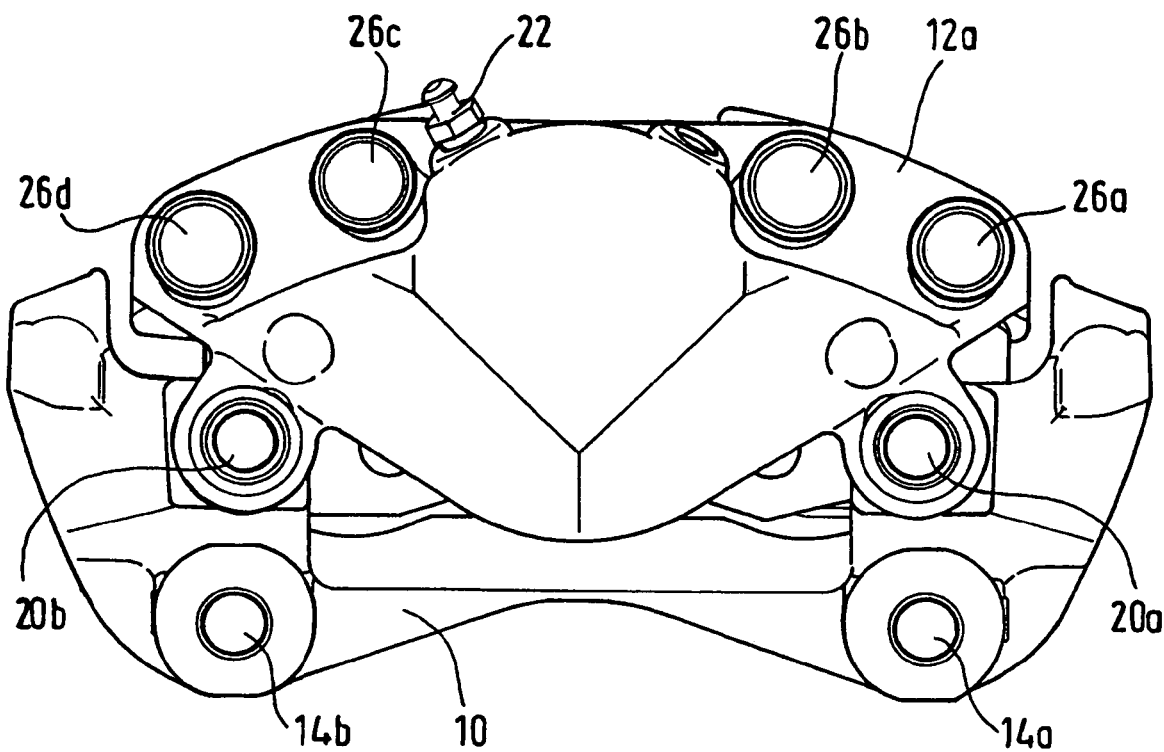
FIG. 7 is the disc brake according to FIGS. 1 to 6 in rear view, i.e. in the assembled state seen from the vehicle inner side.

As can be particularly seen from FIGS. 3, 4, 7, the floating caliper 12 slides on stud bolts 20a, 20b. The stud bolts 20a, 20b are screwed into the stud bolts 18a, 18b positioned on the vehicle inner side, and namely coaxially, as can be seen in particular from FIG. 3. To this end, the stud bolts 18a, 18b are provided centrally with an internal thread into which an external thread of the stud bolts 20a, 20b may respectively be screwed. Thus the stud bolts 20a and 18a and also the stud bolts 20b and 18b are respectively coaxial to one another (cf. FIG. 3). Similarly, the stud bolts 16a, 18a are coaxial and also the stud bolts 16b, 18b (FIG. 6).

Figure 2:
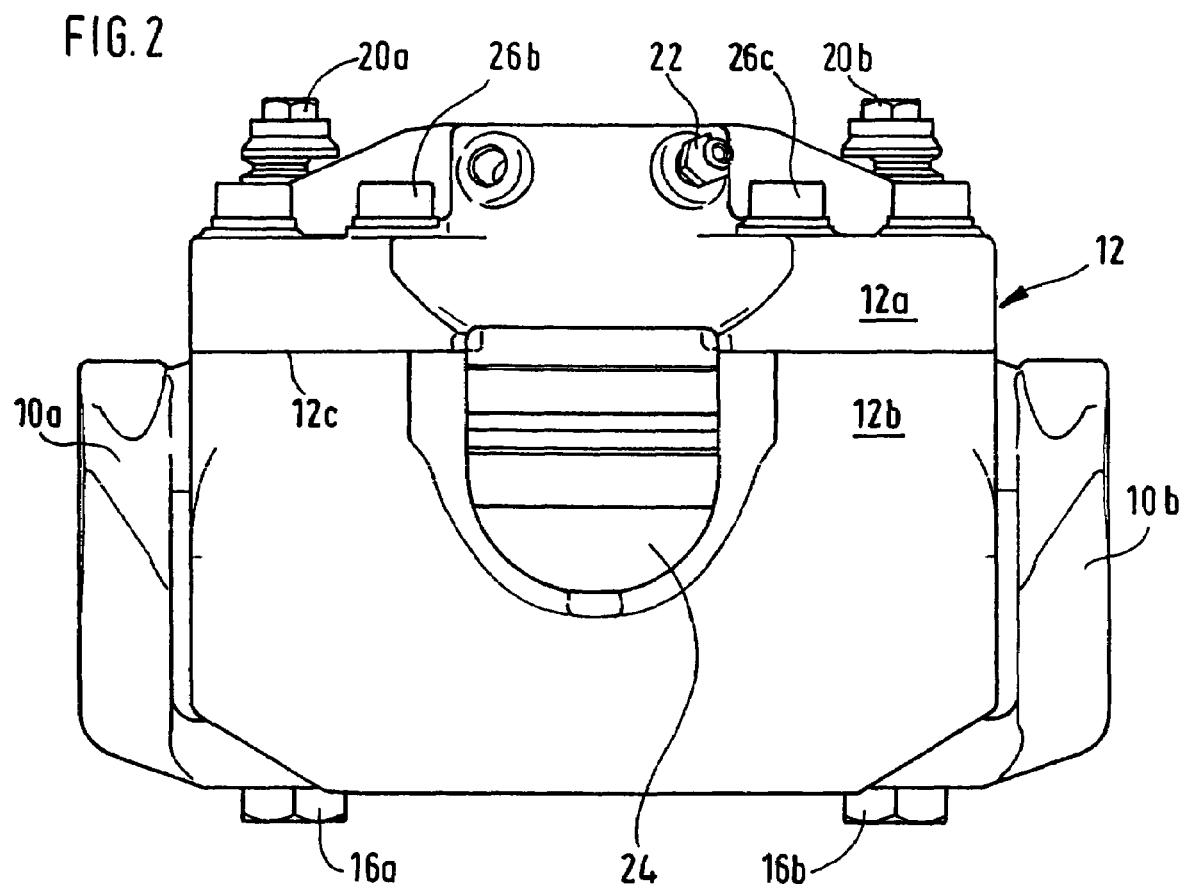
FIG. 2 is the disc brake according to FIG. 1 in plan view, from above onto the brake caliper.

According to FIGS. 2 and 7 the two brake caliper portions 12a, 12b are rigidly connected to one another by means of screws 26a, 26b, 26c, 26d. The contact surface of the two brake caliper portions 12a, 12b is denoted by 12c in FIG. 2.

Brake fluid for moving the piston 28 is introduced into a fluid chamber 30 via a fluid inlet 22 in the conventional manner (cf. FIG. 4). If the fluid pressure is therefore increased in the chamber 30, the piston 28 moves toward the right in FIG. 4 and the brake caliper 12 moves correspondingly toward the left.

Figure 8:
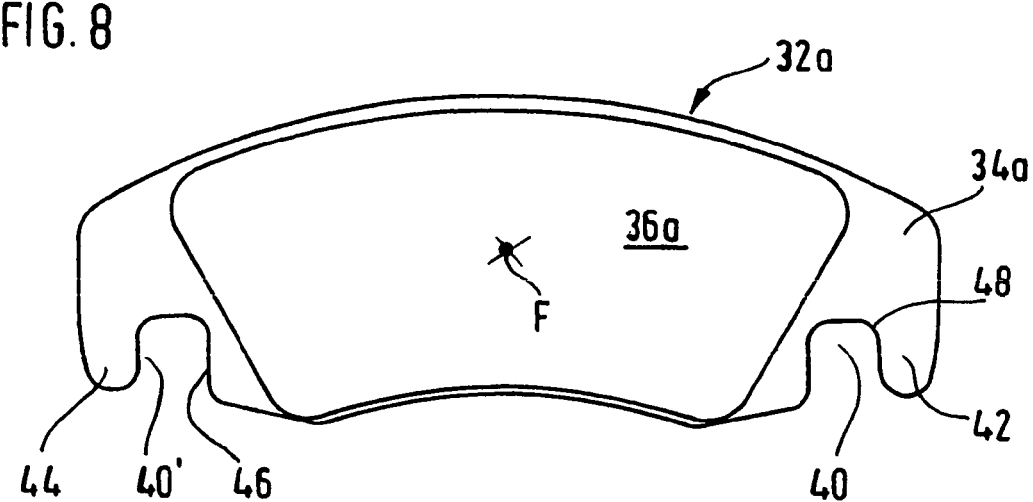
FIG. 8 is a brake pad for using with a disc brake according to FIGS. 1 to 7.
Figure 8:

FIG. 8 shows one (32a) of the two identically constructed brake pads 32a, 32b (cf. also FIG. 4). The brake pad 32a consists of a supporting plate 34a (made of metal) and a friction pad 36a. The friction pad 36a wears down by friction during braking. FIG. 8 also shows the centre of area F of the friction pad 32a. The brake pad comprises a respective U-shaped recess 40, 40' on the leading side and on the trailing side of the brake. FIG. 8 also shows diagrammatically the rotational axis A of the brake disc 38 (the latter not shown in FIG. 8, cf. FIG. 4).

The brake pads 32a, 32b are placed with their U-shaped recesses 40, 40' from above onto the threadless portions of the stud bolts 16a, 16b and 18a, 18b. In this connection, line contact results between a wall in the recesses 40, 40' and the surface of the respective stud bolt 16a, 16b, 18a, 18b.

The brake components, in particular the positions of the stud bolts 16a, 16b, 18a, 18b and the spacings between the recesses 40, 40' in the brake pads 32a, 32b and also the recesses 40, 40' themselves are of a size such that the plane which runs through the longitudinal axes of the stud bolts 16a, 16b, 18a, 18b, has a smaller radial spacing from the rotational axis A of the brake disc (cf. FIG. 8) than the centre of area F of the friction pad. The plane which is spanned by the longitudinal axes of the stud bolts 16a, 16b, 18a, 18b is shown in FIG. 1 and FIG. 5 by P. The position of the axis A of the brake disc is also diagrammatically shown in FIG. 5. This axis lies perpendicular to the drawing plane, cf. also FIG. 8. The spacing between the disc axis A and the plane P spanned by the stud bolts results from dropping a perpendicular from the axis A to the plane. This spacing is denoted by D in FIG. 5.

According to a variant of the invention, the components are of such a size that the longitudinal axes of the bolts 16a, 16b, 18a, 18b have a smaller radial spacing from the brake disc axis A than the centre of area F of the friction pad 36a, 36b.

In the first of the two afore-mentioned ("plane") variants, the said difference in the spacing is preferably at least 5% of the larger of the compared values, more preferably at least 10% and even more preferably at least 15% of the said spacing.

Furthermore, the afore-mentioned dimensions of the brake components are selected such that, when introducing a braking force capable of decelerating the vehicle up to approximately 0.1 g, only tension forces act on the brake pads. When the brake disc in FIG. 8 rotates anticlockwise (about the axis A), then the leading side of the brake is to the right, i.e. corresponding to the recess 40, whilst the trailing side of the brake is located to the left, corresponding to the recess 40'. With braking forces which, with good friction engagement between the tyres and the road surface, do not exceed the afore-mentioned maximum vehicle deceleration of 0.1 g, only tension forces are therefore present on the brake pad 32*a*, i.e. on the leading side (FIG. 8 to the right) the braking forces are absorbed by the lobe 42 on the leading side of the brake pad (the frictional forces act toward the left in FIG. 8). It is only when a braking force exceeding a deceleration of 0.1 g is introduced that the trailing face 46 of the brake pad strikes against the associated bolt in the recess 40' and the braking forces are absorbed by the tension forces (lobe 42) and compression forces (on the face 46).

Furthermore, the dimensions of the brake are selected such that the brake pads 32*a*, 32*b*, when transmitting a braking force which results from a hydraulic brake pressure of up to approximately 10 bar and corresponding to a vehicle deceleration of up to approximately 1 $m/s^2$, only the described tension forces always act on the brake pad, whilst with hydraulic brake pressures of greater than 30 bar, corresponding to a vehicle deceleration of more than 3 $m/s^2$, both tension forces and considerable compression forces (as described above) always act on the brake pads. In the transition region between 10 and 30 bar, a slowly increasing force transmission is introduced by pressure. As a result, the brake carrier may therefore be lightly (low weight) constructed. High circumferential forces are advantageously distributed on both carrier arms.

The afore-mentioned force transmissions by tension and compression are preferably selected for the brake pad at the vehicle outer side. For the brake pads arranged on the vehicle inner side, the dimensions are preferably selected such that said brake pads are predominantly in tension.

Figure 9:
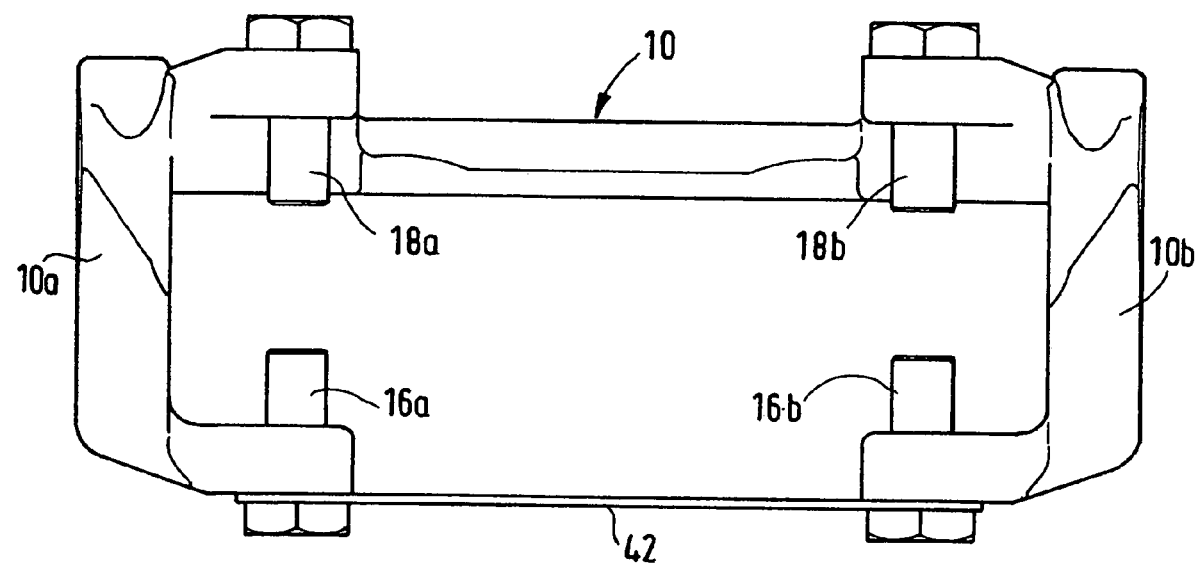
FIG. 9 is an embodiment of the brake carrier in plan view.
Figure 10:
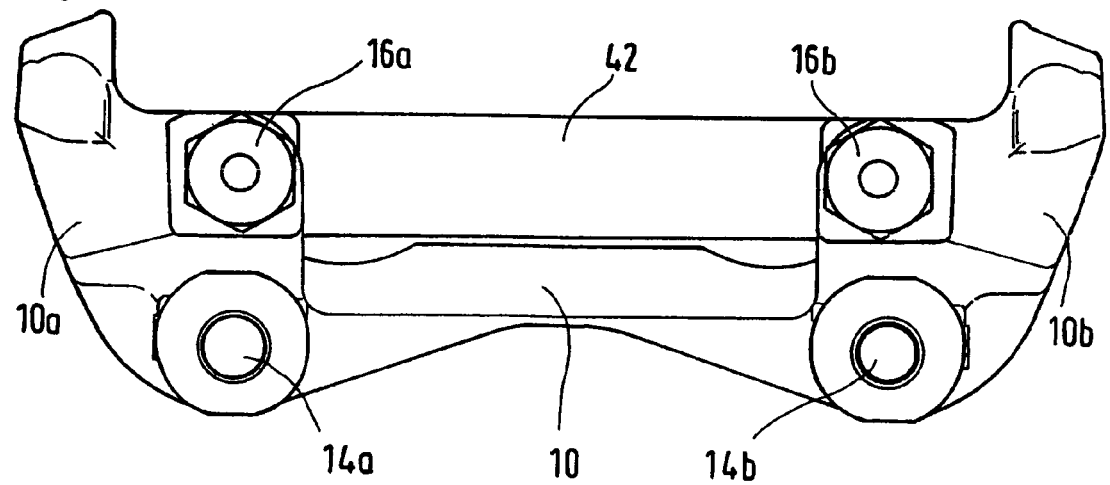
FIG. 10 is the brake carrier according to FIG. 9 in rear view.

FIGS. 9 and 10 show a particular embodiment of the brake in which the brake carrier 10 is provided on the vehicle outer side with a bridge 42 which connects the free arms 10*a*, 10*b* of the brake carrier 10 to one another. The bridge 42 may, for example, consist of sheet metal and is connected by means of the stud bolts 16*a*, 16*b*. The bridge 42 strengthens the brake carrier and may transmit forces. It may also serve to attach, for example a label or even a brand name.

The bridge 42 may also be configured as multilayered sheet metal, in particular provided with damping material, preferably in a sandwich construction with the damping layer between metal layers. Preferably, no damping material is provided in the region of the fastening points (stud bolts 16*a*, 16*b*).

Corresponding to FIG. 8, the U-shaped recesses 40, 40' comprise rounded transition regions at their bases between the side faces, the transition radii (cf. reference numeral 48) being smaller than the radii of the supporting bolts 16*a*, 16*b*, 18*a*, 18*b*. Thus, it is possible to define more precisely the contact lines between the brake pad and the bolt.

The small, preferably linear contact faces of the bolts in the U-shaped recesses 40, 40' allow possible products of corrosion to be removed due to the high surface pressure. Vibrations are substantially avoided.

In the U-shaped recesses 40, 40', that is, between the bolt and the wall of the recess, may be arranged a damping plate, which is e.g. adapted to the "U" in shape. The bolts 16*a*, 16*b*, 18*a*, 18*b* may also be provided with a sleeve, in particular a resilient (elastic) sleeve which may also result in increased damping of vibrations.

The above-described brake in particular also has the advantage that it may be particularly easily manufactured and assembled. During manufacture, only drilling, spot-facing and thread cutting are required for the machining of the brake carrier.

In a modification of the floating caliper brake described as an embodiment above, the invention may also be realised with a fixed caliper disc brake. In this respect the brake carrier and the bolts, in addition to the associated features of the brake pads, correspond to those of the floating caliper disc brake. With the fixed caliper, there is merely a different introduction of force into the brake pads. With the fixed caliper disc brake, the recesses (corresponding to the reference numerals 40, 40' in FIG. 8) may preferably be configured as elongate holes. In these embodiments of the invention a particular advantage can be seen in that, due to the tensioned brake pads, with a four-piston brake all piston diameters may be of the same size. It is not necessary to provide larger piston diameters on the trailing side.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Disc brake having a brake carrier which is adapted to be fastened to a vehicle and which includes bolts for supporting at least one brake pad, wherein the bolts during braking exert tension forces and compression forces on the at least one brake pad, wherein the at least one brake pad comprises a pair of U-shaped recesses which engage the bolts for axially movably guiding the at least one brake pad relative to a brake disc, wherein the pair of U-shaped recesses are respectively arranged at a leading side and at a trailing side of the at least one brake pad such that the tension forces and compression forces are exerted on the brake pad at inner surfaces of the respective U-shaped recesses, and wherein the at least one brake pad is mounted with the U-shaped recesses from above onto the bolts such that a respective one of the bolts is received within each of the U-shaped recesses.

2. Disc brake according to claim 1, wherein the at least one brake pad is arranged on a vehicle outer side and is axially movably guided relative to the brake disc with the U-shaped recesses engaging the associated bolts.

3. Disc brake according to claim 1, wherein the disc brake includes two brake pads axially movably guided relative to the brake disc on opposite sides of the brake disc, wherein each of the brake pads includes U-shaped recesses engaging the bolts and is mounted radially from outwards onto the bolts.

4. Disc brake according to claim 1, wherein the U-shaped recesses of the at least one brake pad have line contact with the respectively associated bolts.

5. Disc brake according to claim 1, wherein the bolts consist of a different material from the brake carrier, namely a non-corroding steel.

6. Disc brake according to claim 1, wherein a plane spanned by a central axis of the bolts has a smaller radial spacing from a brake disc axis than a centre of area of a friction lining of the at least one brake pad.

7. Disc brake according to claim 1, wherein the bolts have a smaller radial spacing from a brake disc axis than a centre of area of a friction lining of the at least one brake pad.

8. Disc brake according to claim 1, wherein the disc brake is a floating caliper disc brake, floating frame disc brake or fixed caliper disc brake.

9. Brake pad for a disc brake, which comprises bolts for supporting the brake pad, such that the brake pad is axially moveable relative to a brake disc of the disc brake, the brake pad comprising two U-shaped recesses respectively arranged at a leading side and at a trailing side of the brake pad for receiving the bolts for the axial movement, wherein the U-shaped recesses are configured for placing the brake pad radially from outwards onto the bolts such that a respective one of the bolts is received within each of the U-shaped recesses and the brake pad is movably guided therewith, and wherein the U-shaped recesses are so dimensioned that, during braking, the bolts exert tension forces and compression forces on the brake pad at inner surfaces of the respective U-shaped recesses.

10. Brake pad according to claim 9, wherein the U-shaped recesses are so dimensioned that line contact is made with the respectively associated bolts.

11. Disc brake according to claim 1, wherein the bolts are provided with a coating of non-corroding material, being a different material from the brake carrier.

12. Brake pad for a disc brake, which has bolts for supporting the brake pad for axial movement relative to a brake disc, the brake pad comprising a pair of U-shaped recesses adapted to receive the bolts of the disc brake for guiding the axial movement, the pair of U-shaped recesses being respectively arranged at a leading side and at a trailing side of the brake pad, wherein the brake pad is adapted to be mounted radially from outwards onto the bolts such that a respective one of the bolts is received within each of the U-shaped recesses, whereby the bolts engage the brake pad within the pair of U-shaped recesses to exert tension forces and compression forces on the brake pad during braking.

13. Brake pad according to claim 12, wherein the pair of U-shaped recesses are adapted to make line contact with the respectively associated bolts.

14. Disc brake having a brake carrier adapted to be fastened to a vehicle and including bolts for supporting at least one brake pad, said bolts adapted to exert tension forces and compression forces on said brake pad during braking, wherein the at least one brake pad comprises a pair of U-shaped recesses which engage the bolts for axially movably guiding the at least one brake pad relative to a brake disc, the pair of U-shaped recesses being respectively arranged at a leading side and at a trailing side of the at least one brake pad, wherein the at least one brake pad is mounted with the U-shaped recesses radially from outwards onto the bolts such that a respective one of the bolts is received within each of the U-shaped recesses whereby the bolts exert the tension forces and compression forces on the brake pad at surfaces within the U-shaped recesses, and wherein the U-shaped recesses make line contact with the respectively associated bolts.

15. Disc brake according to claim 14, wherein the disc brake includes two brake pads supported on said bolts and axially movably guided relative to the brake disc on opposite sides of the brake disc, and wherein each of the brake pads includes a pair of said U-shaped recesses engaging the bolts and is mounted radially from outwards onto the bolts.

* * * * *